United States Patent Office 3,552,973
Patented Jan. 5, 1971

3,552,973
LIGHT SENSITIVE HEXAARYLBIIMIDAZOLE/p-AMINOPHENYL KETONE COMPOSITIONS
David Henry Fishman, West Orange, N.J., assignor to E. I. du Pont de Nemours and Company, Wilmington, Del., a corporation of Delaware
No Drawing. Filed July 20, 1967, Ser. No. 654,677
Int. Cl. G03c 1/72
U.S. Cl. 96—90
22 Claims

ABSTRACT OF THE DISCLOSURE

Photoactivatible compositions comprising, basically, a hexaarylbiimidazole and selected p-aminophenyl ketones having absorption maximally in the near ultraviolet region. The basic composition can be combined with a leuco dye alone or with a leuco dye and an image fixing system. The compositions may be employed with inert solvents, plasticizers and/or binders.

BACKGROUND OF THE INVENTION

(1) Field of the invention

This invention relates to photoactivatible compositions. More specifically, the invention concerns various near ultraviolet sensitive compositions containing a photodissociable hexaarylbiimidazole that absorbs radiation maximally in the ultraviolet at relatively short wavelengths, and a p-aminophenyl ketone sensitizer (i.e., an energy-transfer agent) that absorbs radiation substantially in the ultraviolet at relatively long wavelengths.

(2) Description of the prior art

Compositions of hexaarylbiimidazoles and leuco dyes are known to be photosensitive. They form colored images upon exposure to ultraviolet radiation which can be permanently fixed if a fixing system is added to the original composition. The biimidazole component, upon irradiation, photolyzes and dissociates to the colored triarylimidazolyl radical. This radical then oxidizes the leuco compound to its dye form, whereupon the dye form becomes fixed due to deactivation of the biimidazole by reaction with the fixing system. Thus, the entire sequence is dependent upon the photolization of the biimidazole. However, the hexaarylbiimidazoles in general absorb largely and maximally at ultraviolet (UV) wavelengths below 300 m$\mu$. Thus, while any of the imaging compositions described above containing the biimidazole are sensitive to radiation over substantially the whole UV range, they respond most efficiently to radiation that corresponds to or substantially overlaps the region of maximum absorption; and it is not always practical to irradiate fully into this region. For example, in some imaging applications, it is desired to cover the photosensitive biimidazole-leuco dye imaging composition with a transparent film. Some film materials, such as "Mylar" and "Cronar" commercial polyesters, otherwise suitable, are not transparent below 300 m$\mu$, and thus prevent such short wavelength activating radiation from reaching the biimidazole, with consequent loss in efficiency.

Further, many commercially important ultraviolet sources, such as cathode ray tubes widely useful in imaging devices that convert electrical to light energy and transmit such light as images to photosensitive surfaces (plates, papers, films), emit mainly in the near ultraviolet and above, owing in part to limitations in the available phosphors and in part to the screening by the fiber optic face plate of radiation below 300 m$\mu$. Thus, imaging with such radiation sources is not entirely satisfactory as to the imaging speeds and optical densities that the biimidazole/leuco dye systems can inherently provide.

Thus, as the activating radiation contains increasing proportions of visible components or as components closer to the UV region are filtered out, hexaarylbiimidazole photolysis, hence color formation from leuco dye, becomes less efficient as to the amount of energy utilized and the optical quality of the image produced.

The present invention overcomes these deficiencies by enhancing the efficiency of the systems described above in the near ultraviolet region of absorption through the use of selected p-aminophenyl ketones.

SUMMARY OF THE INVENTION

This invention is based on the surprising discovery that a p-aminophenyl ketone as defined below, which strongly absorbs ultraviolet light at longer wavelengths than the biimidazoles, can transfer such absorbed longer wavelength light energy to the biimidazoles. By thus enhancing the spectral sensitivity of the biimidazoles at wavelengths they normally poorly absorb, the p-aminophenyl ketones significantly enhance their utility as light screens and photooxidants, as described in British Pat. 997,396 published July 7, 1965.

While the sensitization mechanism is not known with certainty, it is considered that when compositions of this invention comprising a relatively short wavelength absorbing biimidazole and a relatively longer wavelength absorbing p-aminophenyl ketone sensitizer as defined are irradiated with such relatively longer wavelength light in the range 300–400 m$\mu$, the biimidazole is only weakly affected, i.e., a substantial proportion of the biimidazole molecules remain in the ground (unactivated) state. The sensitizer, however, responding directly, absorbs the light more fully and is activated to at least one excited energy transfer state. In such state, the activated ketone sensitizer transfers absorbed energy to the biimidazole, for example through collision or resonance interaction, and returns to the ground state, thus becoming available again for activation. The thus-indirectly-activated biimidazole molecules dissociate into imidazolyl radicals.

The overall sensitization process can be represented as

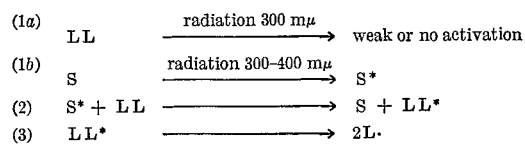

where S is the p-aminophenyl ketone sensitizer, S* its activated energy transfer state; LL is the biimidazole (dimer), LL* its activated, dissociable state; and L· is the resulting imidazolyl radical.

The subsequent fate of the inherently colored and energy-rich imidazolyl radicals and their utilization in accordance with the various embodiments of this invention depends on the substantial absence or presence of other substances that are reactive towards the radicals. Thus, in formulating light screens or windows containing biimidazole/sensitizer compositions of this invention, there will usually be employed other components, such as solvents, plasticizers, and binders that are substantially inert, i.e., resistant, to oxidation by the imidazolyl radicals. In such an embodiment, the sensitization process manifests itself as a color change, attributable to formation of the inherently colored triarylimidazolyl radical (Equation 3). When the light source is removed, the color fades as the radicals dimerize (Equation 4) to the biimidazole:

(4) 

The imidazolyl radicals are useful oxidants, as schematically illustrated in Equation 5:

(5) 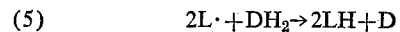

where $DH_2$ for example is an oxidizable substance such as a leuco dye, D is the oxidation product (dye), and LH is the reduction product (a triarylimidazole in this instance).

Thus, the biimidazole/sensitizer combinations are particularly useful as photo-actuated photooxidants for a variety of substrates, including leuco dyes, and the biimidazole/sensitizer/leuco dye combinations constitute the basic ingredients of widely useful photo-actuated imaging systems, as described in British Pat. 1,047,569, published Nov. 9, 1966, and as more fully described below.

The basic composition then of this invention comprises:

(a) A hexaarylbiimidazole that absorbs in the ultraviolet principally at wavelengths below 300 m$\mu$ and is dissociable to triarylimidazolyl radicals by such radiation, and (b) A p-aminophenyl ketone which has a light absorption maximum in the ultraviolet at wavelengths greater than 300 m$\mu$ that is stronger than the absorption of the biimidazole a such wavelengths, and is capable of transferring the absorbed energy corresponding to such wavelengths to the biimidazole. The ketone component is present in an amount sufficient to transfer energy.

Other embodiments of the invention comprise the above basic composition in combination with other components of an imaging system. For example, another composition of the invention comprises a composition of (a) and (b) defined above, and (c) a leuco dye.

Still another composition of the invention comprises (a), (b) and (c) defined above, and (d) a fixing component, e.g., a redox couple defined further below.

It is understood that any of the above compositions of this invention can also contain solvents, plasticizers polymeric binders, and/or carriers which do not affect the ultraviolet absorption or the imaging properties of the primary ingredients.

DETAILED DESCRIPTION OF THE INVENTION

(A) The p-aminophenyl ketone

These sensitizers are those in which (1) the p-amino group is defined broadly, i.e., it includes p-amino per se, and also includes p-alkylamino and p-dialkylamino, and (2) the other half of the ketone sensitizer is either alkyl, monocarbocyclic aryl or another p-aminophenyl group.

These ketones can be represented by the formula

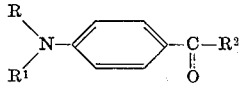

wherein R and R$^1$ are each hydrogen or alkyl, preferably lower alkyl; and R$^2$ is alkyl, preferably lower alkyl, monocarbocyclic aryl, preferably phenyl, or an

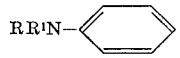

group. By the term "lower" is meant that the alkyl group contains 1–4 carbons. The ketone sensitizers absorb substantially more than the biimidazoles do in the 300–400 m$\mu$ region, and are naturally phosphorescent in rigid media at low temperatures, such as in ether-isopentane alcohol glass at 77° K.

Examples of the ketone sensitizers of this invention include the p-amino, p-alkylamino-, and p-dialkylamino-substituted phenyl alkyl ketones, such as the acetophenones, propiophenones and butyrophenones, as well as the analogously substituted diphenyl ketones. The p-dialkylaminophenyl ketones are preferred, particularly the bis(dialkylamino)benzophenones.

Representative substituted ketone sensitizers include:

p-aminobenzophenone,
p-butylaminobenzophenone,
p-dimethylaminoacetophenone,
p-dimethylaminopropiophenone,
p-diethylaminobutyrophenone,
p-dibutylaminoacetophenone,
p-dimethylaminobenzophenone,
p-dimethylaminophenyl-p-tolyl ketone,
p-diethylaminobenzophenone,
p,p'-bis(ethylamino)benzophenone,
p,p'-bis(dimethylamino)benzophenone (Michler's ketone),
p,p'-bis(diethylamino)benzophenone, and
p,p'-bis(dibutylamino)benzophenone.

The quantity of sensitizer employed may vary widely, but normally will amount to .1 to 2 moles/mole of the biimidazole, preferably about .4 to .6.

In contrast, other ketones, such as acetophenone, propiophenone, benzophenone, 2-acetofluorene, dibenzyl ketone, and 4,4'-dichlorobenzophenone known to sensitize other photochemical systems, are much less or not at all effective to sensitize biimidazole photolysis and the imaging reaction.

(B) The hexaarylbiimidazole component

This component is a 2,2',4,4',5,5'-hexaarylbiimidazole that absorbs ultraviolet light principally at wavelengths below 300m$\mu$ and primarily in the range of 250–275 m$\mu$, and are thereby dissociated into the corresponding 2,4,5-triarylimidazolyl radicals. They can be represented by the formula

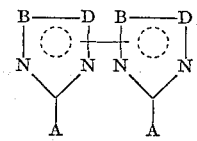

wherein A, B and D represent aryl groups which can be the same or different, carbocyclic or heterocyclic, unsubstituted or substituted with substituents that do not interfere with the dissociation of the biimidazole to the imidazolyl radical or with the oxidation of the leuco dye, and each dotted circle stands for four delocalized electrons (i.e., two conjugated double bonds) which satisfy the valences of the carbon and nitrogen atoms of the imidazole ring. The B and D and groups can be substituted with 0–3 substituent and the A and group with 0–4 substituent.

The aryl groups include one- and two-ring aryls, such as phenyl, biphenyl, naphthyl, furyl and thienyl. Suitable inert substituents on the aryl groups have Hammett sigma (para) values in the —0.5 to 0.8 range and are free of Zerewitinoff hydrogen, i.e., have no hydrogens reactive towards methyl magnesium iodide. Representative substituents and their sigma values, (relative to H=.00), as given by Jaffe, Chem. Rev. 53, 219–233 (1953) are: methyl (—0.17), ethyl (—0.15), t-butyl (—0.20), phenyl (0.01), trifluoromethyl (0.55), chloromethyl (0.18), cyanomethyl (0.01), 2-carboxyethyl (—0.07), butoxy (—0.32), phenoxy (—0.03), fluoro (0.06), chloro (0.23), bromo (0.23), iodo (0.28), methylthio (—0.05), methylsulfonyl (0.73), nitro (0.78), ethoxycarbonyl (0.52), and cyano (0.63). Thus, the substituents may be halogen, cyano, lower hydrocarbyl (including alkyl, halo alkyl, cyanoalkyl, and aryl), alkoxy, aryloxy, alkthio, arylthio, akly sulfonyl, arylsulfonyl, and nitro. In the foregoing list, alkyl groups referred to therein are preferably of 1–6 carbon atoms; while aryl groups referred to therein are preferably of 6–10 carbon atoms.

Preferably the aryl radicals are carbocyclic, particularly phenyl, and the substituents have Hammett sigma values in the range —.4 to +.4, particularly lower alkyl, lower alkoxy, Cl, F and Br groups.

In a preferred biimidazole class, the 2 and 2' aryl groups are phenyl rings bearing an ortho substituent having a Hammett sigma value in the range —.4 to +.4. Preferred such ortho substituents are fluorine, chlorine, bromine, lower alkyl and alkoxy groups; especially chloro.

Most preferably, the 2-phenyl ring carries only the above-described ortho group, and the 4- and 5-phenyl rings are either unsubstituted or substituted with lower alkoxy.

Representative hexaarylbiimidazoles which may be used in the practice of this invention are:

2,2'-bis(o-bromophenyl)-4,4',5,5'-tetraphenylbiimidazole,
2,2'-bis(p-bromophenyl)-4,4',5,5'-tetraphenylbiimidazole,
2,2'-bis(p-carboxyphenyl)-4,4',5,5'-tetraphenylbiimidazole,
2,2'-bis(o-chlorophenyl)-4,4',5,5'-tetrakis(p-methoxyphenyl)biimidazole,
2,2'-bis(o-chlorophenyl)-4,4',5,5'-tetraphenylbiimidazole,
2,2'-bis(p-chlorophenyl)-4,4',5,5'-tetrakis(p-methoxyphenyl)biimidazole,
2,2'-bis(p-cyanophenyl)-4,4',5,5'-tetrakis(p-methoxyphenyl)biimidazole,
2,2'-bis(2,4-dichlorophenyl)-4,4',5,5'-tetraphenylbiimidazole,
2,2'-bis(2,4-dimethoxyphenyl)-4,4',5,5'-tetraphenylbiimidazole,
2,2'-bis(o-ethoxyphenyl)-4,4',5,5'-tetraphenylbiimidazole,
2,2'-bis(m-fluorophenyl)-4,4',5,5'-tetraphenylbiimidazole,
2,2'-bis(o-fluorophenyl)-4,4',5,5'-tetraphenylbiimidazole,
2,2'-bis(p-fluorophenyl)-4,4',5,5'-tetraphenylbiimidazole,
2,2'-bis(o-hexoxyphenyl)-4,4',5,5'-tetraphenylbiimidazole,
2,2'-bis(o-hexylphenyl)-4,4',5,5'-tetrakis(p-methoxyphenyl)biimazole,
2,2'-bis(3,4-methylenedioxyphenyl)-4,4',5,5'-tetraphenylbiimidazole,
2,2'-bis(o-chlorophenyl)-4,4',5,5'-tetrakis(m-methoxyphenyl)biimidazole
2,2'-bis(o-chlorophenyl)-4,4',5,5'-tetrakis[m-(betaphenoxyethoxyphenyl)biimidazole,
2,2'-bis(2,6-dichlorophenyl)-4,4',5,5'-tetraphenylbiimidazole,
2,2'-bis(o-methoxyphenyl)-4,4',5,5'-tetraphenylbiimidazole,
2,2'-bis(p-methoxyphenyl)-4,4'-bis(o-methoxyphenyl)-5,5'-diphenylbiimidazole,
2,2'-bis(o-nitrophenyl)-4,4',5,5'-tetraphenylbiimidazole,
2,2'-bis(p-phenylsulfonylphenyl)-4,4',5,5'-tetraphenylbiimidazole,
2,2'-bis(p-sulfamoylphenyl)-4,4',5,5'-tetraphenylbiimidazole,
2,2'-bis(2,4,6-trimethylphenyl)-4,4',5,5'-tetraphenylbiimidazole,
2,2'-di-4-biphenylyl-4,4',5,5'-tetraphenylbiimidazole,
2,2'-di-1-naphthyl-4,4',5,5'-tetrakis(p-methoxyphenyl)biimidazole,
2,2'-di-9-phenanthryl-4,4',5,5'-tetrakis(p-methoxyphenyl)biimidazole,
2,2'-diphenyl-4,4',5,5'-tetra-4-biphenylylbiimidazole,
2,2'-diphenyl-4,4',5,5'-tetra-2,4-xylylbiimidazole,
2,2'-di-3-pyridyl-4,4',5,5'-tetraphenylbiimidazole,
2,2'-di-3-thienyl-4,4',5,5'-tetraphenylbiimidazole,
2,2'-di-o-tolyl-4,4',5,5'-tetraphenylbiimidazole,
2,2'-di-p-tolyl-4,4'-di-o-tolyl-5,5'-diphenylbiimidazole,
2,2'-di-2,4-xylyl-4,4',5,5'-tetraphenylbiimidazole,
2,2'-4,4',5,5'-hexakis(p-benzylthiophenyl)biimidazole,
2,2',4,4',5,5'-hexa-1-naphtylbiimidazole,
2,2',4,4',5,5'-hexaphenylbiimidazole,
2,2'-bis(2-nitro-5-methoxyphenyl)-4,4',5,5'-tetraphenylbiimidazole, and
2,2'-bis(o-nitrophenyl)-4,4',5,5'-tetrakis(m-methoxyphenylbiimidazole.

The biimidazoles are conveniently obtained by known methods as more particularly described by British Pat. 997,396, and by Hayashi et al., Bull. Chem. Soc. Japan 33, 565 (1960). The preferred method, involving oxidative dimerization of the corresponding triarylimidazole with ferricyanide in alkali, generally yields the 1,2'-biimidazoles, although other isomers, such as the 1,1',1,4',2,2', 2,4' and 4,4'-biimidazoles are sometimes also obtained admixed with the 1,2'-isomer. For the purposes of this invention, it is immaterial which isomer is employed so long as it is photodissociable to the imidazolyl radical as discussed above.

Biimidazoles useful in this invention are described in British Pat. 997,396, published July 7, 1965.

(C) The leuco dye component

The leuco dye component together with the basic composition forms one embodiment of this invention. By the term "leuco dye" is meant the colorless (i.e., the reduced) form of a dye compound which upon oxidation becomes colored. When present in the composition of this invention, it is oxidized to its colored form by the imidazolyl radical.

Leuco dyes which may be oxidized to color by triarylimidazolyl radicals generated by this invention include: aminotriarylmethanes, aminoxanthenes, aminothioxanthenes, amino-9,10-dihydroacridines, aminophenoxazines, aminophenothiazines, aminodihydrophenazines, aminodiphenylmethanes, leuco indamines, aminohydrocinnamic acids (cyanoethanes, leuco methines), hydrazines, leuco indigoid dyes, amino-2,3-dihydroanthraquinones, tetrahalo-p,p'-biphenols, 2-(p-hydroxyphenyl)-4,5 - diphenylimidazoles, phenethylanilines, 10-acyl-aminodihydrophenazines, 10-acylaminophenothiazines, 10-acyl-aminophenoazines; aminotriarylmethanes wherein the methane hydrogen has been replaced by alkylthio, benzylthio, 2-phenylhydrazino, or alkoxycarbonyl; aminotriarylmethanes wherein two aryl groups are substituted with a p-disubstituted amino and an alkyl group and the third aryl is p-alkylthiophenyl, p-arylthiophenyl, aralkylthiophenyl, 2-thienyl, 2-furyl, 3,4-methylenedioxyphenyl, 2-methoxy-4-($C_1$ to $C_8$)-alkoxyphenyl or 3,4-di-($C_1$ to $C_8$)alkoxyphenyl.

Leuco triarylmethane dyes that contain tertiary amino groups are preferred, particularly those wherein (1) at least two aryls are phenyls having (a) a para-$R_1R_2N$ substituent, where $R_1$ and $R_2$ are $C_1$–$C_{10}$ alkyl, 2-hydroxyethyl, 2-cyanoethyl, benzyl or phenyl, and (b) an ortho $C_1$–$C_6$ alkyl, $C_1$–$C_6$ alkoxy, fluoro, chloro, or bromo-substituent, and (2) the third aryl, when different from the first two, is thienyl, furyl, phenyl or phenyl substituted with one or more $C_1$–$C_6$ alkyl, $C_1$–$C_6$ alkoxy, methylenedioxy, fluoro, chloro, bromo, amino, alkylamino, dialkylamino, alkylthio, hydroxy, carboxy, carbonamido, carbalkoxy, lower alkylsulfonyl, lower alkylsulfonamido, arylsulfonamido, nitro, or benzylthio groups. Representative aminotriarylmethanes that may be used in this invention follow:

bis(2-bromo-4-diethylaminophenyl)phenylmethane,
bis(2-butoxy-4-diethylaminophenyl)phenylmethane,
bis[4-(2-cyanoethyl)(2-hydroxyethyl)amino-o-tolyl](p-benzylthiophenyl)methane,
bis[4-(2-cyanoethyl)(2-hydroxyethyl)amino-o-tolyl]2-thienylmethane,
bis(4-dibutylamino-o-tolyl)2-thienylmethane,
bis(4-diethylamino-2-ethylphenyl)(3,4-methylenedioxyphenyl)methane,
bis(4-diethylamino-2-fluorophenyl)(p-benzylthiophenyl)methane,
bis(4-diethylamino-2-fluorophenyl)(3,4-methylenedioxypheny)methane,
bis(4-diethylamino-2-fluorophenyl)(p-benzylthiophenyl)methane,
bis(4-diethylamino-1-naphthyl)(4-diethylamino-o-tolyl)methane,
bis(4-diethylamino-o-tolyl)(p-benzylthiophenyl)methane,
bis(4-dimethylamino-o-tolyl)(2,4-dimethoxyphenyl)methane,
bis(4-diethylamino-o-tolyl)2-furylmethane,
bis(4-diethylamino-o-tolyl)(p-methoxyphenyl)methane,
bis(4-diethylamino-o-tolyl)(3,4-methylenedioxyphenyl)methane, bis(4-diethylamino-o-tolyl)(p-methylthiophenyl)
  methane,
bis(4-diethylamino-o-tolyl) 1-naphthylmethane,
bis(4-diethylamino-o-tolyl)phenylmethane,
bis(4-diethylamino-o-tolyl) 2-thienylmethane,
tris(4-dimethylamino-2-chlorophenyl)methane,
bis(4-dimethylamino-2,5-dimethylphenyl)phenyl-
  methane,
bis(4-dimethylamino-2-hexylphenyl) (p-butylthiophenyl)
  methane,
bis(4-dimethylamino-o-tolyl) (o-bromophenyl)methane,
bis[4-(N-ethylanilino)-o-tolyl](3,4-dibutoxyphenyl)
  methane,
bis(4-ethylbenzylamino-o-tolyl) (p-methoxyphenyl)
  methane,
bis[4-bis(2-hydroxyethyl)-amino-2-fluorophenyl](p-
  benzylthiophenyl)methane,
tris(4-diethylamino-o-tolyl)methane, and
tris(p-dioctylamino-o-tolyl)methane,
bis(4-diethylamino-o-tolyl)-p-chlorophenyl methane
bis(4-diethylamino-o-tolyl)-p-bromophenyl methane
bis(4-diethylamino-o-tolyl)-p-fluorophenyl methane
bis(4-diethylamino-o-tolyl)-p-tolyl methane
bis(4-diethylamino-o-tolyl)-4-methoxy-1-naphthyl
  methane
bis(4-diethylamino-o-tolyl)-3,4,5-trimethoxyphenyl
  methane
bis(4-diethylamino-o-tolyl)-p-hydroxyphenyl methane
bis(4-diethylamino-o-tolyl)-3-methylthienyl methane
5-[bis(4-diethylamino-o-tolyl)-methyl]-2,3-cresotic acid
4-[bis(4-diethylamino-o-tolyl)-methyl]-phenol
4-[bis(4-diethylamino-o-tolyl)-methyl]-acetanilide
4-[bis(4-diethylamino-o-tolyl)-methyl]-phenylacetate
4-[bis(4-diethylamino-o-tolyl)-methyl]-benzoic acid
4-[bis(4-diethylamino-o-tolyl)-methyl]-diphenyl sulfone
4[bis(4-diethylamino-o-tolyl)-methyl]-phenylmethyl
  sulfone
4-[bis(4-diethylamino-o-tolyl)-methyl]-methylsulfonanilide
4-[bis(4-diethylamino-o-tolyl)-methyl]-p-tolylsulfonanilide
bis(4-diethylamino-o-tolyl)-p-nitrophenyl methane These amino substituted cationic dye precursors are generally employed in the color forming process as salts of strong acids, including Lewis acids, such as hydrochloric, hydrobromic, sulfuric, nitric, phosphoric, acetic, oxalic, p-toluenesulfonic, zinc chloride, zinc bromide, and ferric chloride, the proportion of acid varying from 0.33 mole to 1 mole per amino group.

Representative leuco compounds of the other classes are as follows.

Aminoxanthenes:

3-amino-6-dimethylamino-2-methyl-9-(o-chlorophenyl)
  xanthene
3-amino-6-dimethylamino-2-methyl-9-phenylxanthene
3-amino-6-dimethylamino-2-methylxanthene
3,6-bis(diethylamino)-9-(o-chlorophenyl)xanthene
3,6-bis(diethylamino)-9-hexylxanthene
3,6-bis(diethylamino)-9-(o-methoxycarbonylphenyl)
  xanthene
3,6-bis(diethylamino)-9-methylxanthene
3,6-bis(diethylamino)-9-phenylxanthene
3,6-bis(diethylamino)-9-o-tolylxanthene
3,6-bis(dimethylamino)-9-(o-chlorophenyl)xanthene
3,6-bis(dimethylamino)-9-ethylxanthene
3,6-bis(dimethylamino)-9-(o-methoxycarbonylphenyl)
  xanthene
3,6-bis(dimethylamino)-9-methylxanthene.

Aminothioxanthenes:

3,6-bis(diethylamino)-9-(o-ethoxycarbonylphenyl)
  thioxanthene
3,6-bis(dimethylamino)-9-(o-methoxycarbonylphenyl)
  thioxanthene
3,6-bis(dimethylamino)thioxanthene
3,6-dianilino-9-(o-ethoxycarbonylphenyl)thioxanthene Amino-9,10-dihydroacridine:

3,6-bis(benzylamino)-9,10-dihydro-9-methylacridine
3,6-bis(diethylamino)-9-hexyl-9,10-dihydroacridine
3,6-bis(diethylamino)-9,10-dihydro-9-methylacridine
3,6-bis(diethylamino)-9,10-dihydro-9-phenylacridine
3,6-diamino-9-hexyl-9,10-dihydroacridine
3,6-diamino-9,10-dihydro-9-methylacridine
3,6-diamino-9,10-dihydro-9-phenylacridine
3,6-bis(dimethylamino)-9-hexyl-9,10-dihydroacridine
3,6-bis(dimethylamino)-9,10-dihydro-9-methylacridine.

Aminophenoxazines:

3,7-bis(dimethylamino)phenoxazine
3,7-bis(diethylamino)phenoxazine
3,7-bis(dibutylamino)phenoxazine
3-diethylamino-7-dimethylamino-2-methylphenoxazine
3-dimethylamino-7-dipropylaminophenoxazine
5-dimethylamino-9-diethylamino-12H-benzo[a]
  phenoxazine
5-dibenzylamino-9-diethylamino-12H-benzo[a]
  phenoxazine
5,9-bis(diethylamino)-12H-benzo[a]phenoxazine Acylation gives the corresponding 10-acyl compounds.

Aminophenothiazines:

3,7-bis(dimethylamino)phenothiazine
3,7-bis(dimethylamino)-4,6-dimethylphenothiazine
3,7-bis(diethylamino)-2,8-dimethylphenothiazine
3,7-bis(dimethylamino)-4-nitrophenothiazine
3,7-bis(dibutylamino)phenothiazine
3-diethylamino-7-dimethylaminophenothiazine
3-dimethylamino-7-N-benzyl-N-methylaminophenothiazine
3,7-bis(N-benzyl-N-ethylamino)phenothiazine Acylation gives the corresponding 10-acyl compounds.

Aminodihydrophenazines:

3,7-bis(benzylethylamino)-5,10-dihydro-5-phenylphenazine
3,7-bis(diethylamino)-5-hexyl-5,10-dihydrophenazine
3,7-bis(dihexylamino)-5,10-dihydrophenazine
3,7-bis(dimethylamino)-5-(p-chlorophenyl)-5,10-dihydrophenazine
3,7-diamino-5-(o-chlorophenyl)-5,10-dihydrophenazine
3,7-diamino-5,10-dihydrophenazine
3,7-diamino-5,10-dihydro-5-methylphenazine
3,7-diamino-5-hexyl-5,10-dihydrophenazine
3,7-bis(dimethylamino)-5,10-dihydrophenazine
3,7-bis(dimethylamino)-5,10-dihydro-5-phenylphenazine
3,7-bis(dimethylamino)-5,10-dihydro-5-methylphenazine Acylation gives the corresponding 10-acyl compounds.

Aminodiphenylmethanes:

1,4-bis[bis-p(diethylaminophenyl)methyl]piperazine
bis(p-diethylaminophenyl)anilinomethane
bis(p-diethylaminophenyl)-1-benzotriazolylmethane
bis(p-diethylaminophenyl)-2-benzotriazolylmethane
bis(p-diethplaminophenyl) (p-chloroanilino)methane
bis(p-diethylaminophenyl)(2,4-dichloroanilino)methane
bis(p-diethylaminophenyl) (methylamino)methane
bis(p-diethylaminophenyl) (octadecylamino)methane
bis(p-dimethylaminophenyl)aminomethane
bis(p-dimethylaminophenyl)anilinomethane
1,1-bis(dimethylaminophenyl)ethane
1,1-bis(dimethylaminophenyl)heptane
bis(4-methylamino-m-tolyl)aminoethane.

Leuco indamines:

4-amino-4'-dimethylaminodiphenylamine
p-(p-dimethylaminoanilino)phenol

Aminohydrocinnamic acids (cyanoethanes, leuco methines):

4-amino-α,β-dicyanohydrocinnamic acid, methyl ester
4-anilino-α,β-dicyanohydrocinnamic acid, methyl ester
4-(p-chloroanilino)-α,β-dicyanohydrocinnamic acid, methyl ester
α-cyano-4-dimethylaminohydrocinnamamide
α-cyano-4-dimethylaminohydrocinnamic acid, methyl ester
α,β-dicyano-4-diethylaminohydrocinnamic acid, methyl ester
α,β-dicyano-4-dimethylaminohydrocinnamamide
α,β-dicyano-4-dimethylaminohydrocinnamic acid, methyl ester
α,β-dicyano-4-dimethylaminohydrocinnamic acid
α,β-dicyano-4-dimethylaminohydrocinnamic acid, hexyl ester
α,β-dicyano-4-ethylaminohydrocinnamic acid, methyl ester
α,β-dicyano-4-hexylaminohydrocinnamic acid, methyl ester
α,β-dicyano-4-methylaminocinnamic acid, methyl ester
p-(2,2-dicyanoethyl)-N,N-dimethylaniline
4-methoxy-4'-(1,2,2-tricyanoethyl)azobenzene
4-(1,2,2-tricyanoethyl)azobenzene
p-(1,2,2-tricyanoethyl)-N,N-dimethylaniline Hydrazines:

1-(p-diethylaminophenyl)-2-(2-pyridyl)hydrazine
1-(p-dimethylaminophenyl)-2-(2-pyridyl)hydrazine
1-(3-methyl-2-benzothiazolyl)-2-(4-hydroxy-1-naphthyl)hydrazine
1-(2-naphthyl)-2-phenylhydrazine
1-p-nitrophenyl-2-phenylhydrazine
1-(1,3,3-trimethyl-2-indolinyl)-2-(3-N-phenylcarbamoyl-4-hydroxy-1-naphthyl)hydrazine Leuco indigoid dyes.—The leuco forms of indigoid dyes having CI numbers 73000, 73015, 73025, 73030, 73035, 73040, 73045, 73050, 73055, 73060, 73065, 73070, 73085, 73090, 73110, 73300, 73305, 73310, 73315, 73320, 73325, 73335, 73340, 73345, 73350, 73360.

Amino-2,3-dihydroanthraquinones:

1,4-dianilino-2,3-dihydroanthraquinone
1,4-bis(ethylamino)-2,3-dihydroanthraquinone Phenethylanilines:

N-(2-cyanoethyl)-p-phenethylaniline
N,N-diethyl-p-phenylethylaniline
N,N-dimethyl-p-[2-(1-naphthyl)ethyl]aniline
N,N-dimethyl-p-[2-(4-nitro-1-naphthyl)ethyl]aniline
N,N-dimethyl-p-phenethylaniline
N,N-dimethyl-p-[2-(4-methoxy-1-naphthyl)ethyl]aniline
p-(p-methoxyphenethyl)aniline
p-[2-(1-naphthyl)ethyl]aniline
p-(p-nitrophenethyl)aniline
p-phenethylaniline Alkyl- and benzylthio derivatives of aminotriarylmethane:

tris(p-dimethylaminophenyl)benzylthiomethane
bis(p-dimethylaminophenyl)-p-dipropylaminophenylbenzylthiomethane
bis(p-dimethylaminophenyl)-p-propoxyphenylbenzylthiomethane
bis(p-diethylaminophenyl)-p-cyanophenylbenzylthiomethane
bis(p-diethylaminophenyl)-p-chlorophenylbenzylthiomethane
bis(p-diethylaminophenyl)-p-fluorophenylbenzylthiomethane
bis(p-diethylaminophenyl)-p-pentoxyphenylbenzylthiomethane
bis(p-diethylaminophenyl)-p-carbamoylphenylbenzylthiomethane
bis(p-diethylaminophenyl)-p-nitrophenylbenzylthiomethane
bis(4-diethylamino-2-methoxyphenyl)-p-ethylphenylmethylthiomethane
bis(4-diethylamino-2-propoxyphenyl)-2-chloro-4-octylphenylethylthiomethane
bis(p-diethylaminophenyl)-2,4-dimethoxyphenylpropylthiomethane
bis(p-diethylaminophenyl)-4-bromo-2-methoxyphenylbutylthiomethane 2-phenylhydrazino derivatives of aminotriarylmethane:

1-tris(p-diethylaminophenyl)methyl-2-phenylhydrazine
1-tris(4-diethylamino-2-chlorophenyl)methyl-2-phenylhydrazine
1-tris(4-diethylamino-o-tolyl)methyl-2-phenylhydrazine
1-[bis(p-dimethylaminophenyl)phenylmethyl]-2-phenylhydrazine
1-[bis(4-dimethylamino-2-methoxyphenyl)-p-nitrophenylmethyl]-2-phenylhydrazine
1-[bis(p-dipropylaminophenyl)-2,4-dichlorophenylmethyl]-2-phenylhydrazine Alkoxycarbonyl derivatives of aminotriarylmethane:

tris(p-dimethylaminophenyl)ethoxycarbonylmethane (or ethyl tris(p-dimethylaminophenyl)acetate)
tris(p-dibutylaminophenyl)pentoxycarbonylmethane
tris(4-didodecylamino-o-tolyl)methoxycarbonylmethane
tris[4-(N-ethyl-N-phenylamino)-2-ethylphenyl]ethoxycarbonylmethane
tris[4-bis(2-methoxyethyl)amino-2-bromophenyl]ethoxycarbonylmethane
tris[4-bis(2-cyanoethyl)amino-2-chlorophenyl]ethoxycarbonylmethane
tris[4-bis(2-hydroxyethyl)amino-2-fluorophenyl]ethoxycarbonylmethane
tris(4-dibenzylamino-2-pentoxyphenyl)ethoxycarbonylmethane Aminotriarylmethanes having specified aryl groups:

Bis[4-(N-benzyl-N-ethylamino)-o-tolyl](p-benzylthiophenyl)methane.
Bis[4-bis(2-cyanoethyl)amino-o-tolyl](p-benzylthiophenyl)methane.
Bis[4-bis(2-ethoxyethyl)amino-o-tolyl](p-benzylthiophenyl)cyanomethane.
Bis[4-bis(2-hydroxyethyl)amino-2-ethylphenyl](p-benzylthiophenyl)methane.
Bis[4-bis(2-hydroxyethyl)amino-2-fluorophenyl](p-benzylthiophenyl)methane.
Bis[4-bis(2-hydroxyethyl)amino-2-fluorophenyl](p-benzylthiophenyl)methane.
Bis[4-bis(2-hydroxyethyl)amino-2-fluorophenyl](p-benzylthio-m-butylphenyl)methane.
Bis(4-diethylamino-o-tolyl)(p-benzylthiophenyl)cyanomethane.
Bis(4-diethylamino-o-tolyl)(p-phenylthiophenyl)methane.
Bis(4-diethylamino-o-tolyl)[p-(o-tolylthio)phenyl]methane.
Bis[4-bis(2-cyanoethyl)amino-o-tolyl](3,4-dibutoxyphenyl)methane.
Bis[4-bis(2-cyanoethyl)amino-o-tolyl]2-furylmethane.
Bis[4-bis(2-hydroxyethyl)amino-o-tolyl](3,4-dioctyloxyphenyl)cyanomethane.
Bis[4-bis(3-hydroxypropyl)amino-o-tolyl](2-methoxy-4-octyloxyphenyl)methane.
Bis[4-bis(2-methoxyethyl)amino-o-tolyl](3,4-methylenedioxyphenyl)methane.
Bis(4-dibenzylamino-o-tolyl)2-thienylmethane.
Bis(4-dimethylamino-2-ethylphenyl)(3,4-methylenedioxyphenyl)methane.

Bis(4-dimethylamino-2-ethylphenyl)2-thienylcyanomethane.
Bis(4-dimethylamino-o-tolyl)(2,4-dimethoxyphenyl)methane.

The leuco dyes are described in British Pat. 1,047,796, published Nov. 9, 1966; Italian Pat. 707,086, issued May 24, 1966 and in U.S. patent application Ser. Nos. 363,638 and 363,639, both filed Apr. 29, 1964 and assigned to the assignee herein.

(D) The fixing component

The fixing component is so named because when present it fixes the colored form of the leuco dye permanently. The fixing component can be any material which will maintain the permanent image. For example, a redox system such as described in British Pat. 1,057,785 is useful. The component described therein comprises an oxidant and a reductant which react with each other when irradiated with actinic light of a different wavelength than that used to activate the p-aminophenyl ketone. The reaction between the oxidant and reductant forms a reducing agent which reacts with and deactivates the activated biimidazole. Thus the leuco image will remain stable. Other qualifications of this system are that it is unreactive at the wavelengths used to activate the ketone and that it is unreactive with the leuco dye at any wavelength. Examples of the oxidant include quinones, ketones, phenazines, acridines, phenoxazinones, quinolines, phenanthrolines, isoquinolines, and anils. Examples of the reductant include ethers, esters, alcohols, compounds containing allylic or benzylic hydrogen, i.e., containing a methylene group attached to a carbon that is itself attached to another carbon by a double bond, acetals, aldehydes and amides. Specific examples of such compounds are found in said British Pat. 1,057,785 and are incorporated herein, some of which are 1,2-naphthoquinone, 2,5-diethoxy-p-benzoquinone, 3 - acetylphenanthrenequinone, 1,6-pyrenequinone, 1,8-pyrenequinone, 4-nitro-9,10-phenanthrenequinone and 2-methylanthraquinone, as oxidants; and dioxane, polyethylene glycol (M.W. 600), polypropylene glycol (M.W. 1000), polytetramethyleneether glycol (M.W. 1000), methoxyethyl terephthalate, cyclohexyl adipate, and 1,3-cyclohexylene diacetate as reductants.

Another type of fixing agent is an organic progenitor of a reducing agent which forms a reducing agent upon heat treatment, but is otherwise inert to the biimidazoleleuco dye imaging system. The reducing agent so formed then reacts with and deactivates the activated biimidazole. Generally, the heat necessary to transform the progenitor will be between 80° C. and 160° C. Examples of such progenitors include acetals, orthoesters, carbonates and orthocarbonates of hydroquinones and phenols such as hydroquinone, phenylhydroquinone, t-butylhydroquinone, durohydroquinone, p-benzylhydroquinone, naphthalene - 1,4 - diol, resorcinol, pyrogallol, 2,4,6-tri-tert-butylphenol, 2,6-di-tert-butyl-p-cresol, and 2,4,6-trimethylphenol; semicarbazones of aldehydes and ketones; Schiffs' bases of primary aromatic amines such as aniline and 1-naphthylamines; diketones which tautomerize to hydroquinones on heating such as 2,4-dihydro-1,4-naphthoquinone and 4α,5,8,8α-tetrahydro-1,4-naphthoquinone. These and other heat-sensitive progenitors are described more fully in Manos U.S. Ser. No. 363,625, filed Apr. 29, 1964, and assigned to the assignee herein.

Still another type of fixing agent are diazonium compounds which, upon exposure to radiation of a wavelength different than that which energizes the biimidazole, yield a reducing agent directly. The reducing agent then reacts with and deactivates the biimidazole. Examples of diazonium compounds include diazotized, p-(p-tolylthio) aniline, 2,4,5-trimethoxyaniline; 4-(4-amino - 3 - butylphenyl)morpholine, 4 - (p-aminophenyl)morpholine, 4-amino-1-naphthol, N,N - diethyl-1,4-naphthalenediamine, 4-amino-2,6-dimethoxyphenol, $N^1,N^1$-diethyl - 4 - methyl- m-phenylenediamine, N,N - diethyl-o-phenylenediamine, N-methyl-N-phenyl-o-phenylenediamine, and p-phenylenediamine.

These fixing agents are described in Cescon U.S. patent application Ser. No. 448,839, filed Apr. 16, 1965, and assigned to the assignee herein.

A preferred oxidant-reductant combination fixing agent comprises as oxidant pyrenequinone or phenanthrenequinone and as reductant a lower alkyl ester of nitrilotriacetic or nitrilotripropionic acid; an ether having abstractable hydrogen, such as dioxane, polyethylene glycol, polypropylene glycol, polytetramethylene glycol; or an ester having abstractable hydrogen such as methoxyethyl terephthate, cyclohexyl adipate, 1,3-cyclohexylene diacetate, or mixtures thereof. Preferably the reductant is a polyalkylene glycol such as polyethylene glycol.

(E) Preferred composition ratios and other components

As previously stated, the basic composition, for sunscreen shields, etc., is preferably composed of .1 to 2 moles of the ketone to 1 mole of the biimidazole, and most preferably .4 to .6 mole of ketone per mole of biimidazole.

For developing colored images through exposure to light, the biimidazole/near UV sensitizer/leuco dye combination will normally be employed in molar ratios 1/.1–2/.1–10, preferably 1/.4–.6/.5–2.

Amounts of the oxidant-reductant fixing system will range from molar ratios of 0.01:1 to 2:1 of oxidant to biimidazole, with 0.2:1 to 0.5:1 preferred. The reductant components can range from molar ratios of 1:1 to 40:1 of reductant to oxidant. Amounts of the organic progenitor fixing agent will range from molar ratios of 1:5 to 20:1 of progenitor to biimidazole. The diazonium fixing agent can range from molar ratios of 0.2:1 to 10:1 of agent to biimidazole.

Further, it will be normally advantageous to include other components in the imaging formulation, such as solvents, plasticizers and/or binders (0.5% by weight or more of each based on the total weight of imaging composition) to provide for intimate contact among the biimidazole, ketone, leuco dye, and fixing system, and facilitate their application to substrates in coating applications.

Suitable solvents are those inert to the other ingredients of the composition and include amides such as N,N-dimethylformamide, N,N - dimethylacetamide; alcohols such as methanol, ethanol, 1 - propanol, 2 - propanol, butanol, ethylene glycol; ketones such as acetone, methyl ethyl ketone, 3-pentanone; halocarbons such as methylene chloride, chloroform, 1,1,2-trichlorethane, and 1,1,2,2-tetrachloroethane; polyethylene glycols; esters, e.g., ethyl acetate and ethyl benzoate; aryls such as benzene, o-dichlorobenzene and toluene; dimethylsulfoxide, pyridine, acetonitrile, tetrahydrofuran, dioxane, 1,1,2-trichloro ethylene, 1-methyl-2-oxohexamethyleneimine, and mixtures thereof.

Suitable inert plasticizers include the polyethyleneglycols, such as the commercially available carbowaxes, and related materials, such as substituted phenol-ethylene oxide adducts for example the products obtained from p-phenylphenol and 6 moles ethylene oxide, and from p-nonylphenol and 2 moles ethylene oxide, including commercially available materials such as the Igepal alkyl phenoxy polyoxyethylene ethanols.

Polymeric materials, particularly light-transparent and film-forming polymers, are useful as inert binders, and carriers for the essential ingredients described above; thus, biimidazole, leuco dye, sensitizer and polymer, with or without a mutual solvent, may be mixed, then sprayed, extruded, cast, pressed or otherwise formed into supported or unsupported films or shaped articles. Representative polymers are polyvinyl alcohol, ethy cellulose, polyvinyl chloride, polystyrene, polyvinyl acetate, poly(methyl methacrylate), cellulose acetate, cellulose butyrate, copolymers of vinyl monomers, gelatin, and polyethylene. Other suitable inert materials which may be used include glasses, resins, and waxes.

Typical inert substrates include materials commonly used in the graphic arts in decorative applications, such as paper ranging from tissue paper to heavy cardboard; films of plastics and polymeric materials such as regenerated cellulose, cellulose acetate, cellulose nitrate, polyester of glycol and terephthalic acid, vinyl polymers and copolymers, polyethylene, poylvinylacetate, polymethyl methacrylate, polyvinylchloride; textile fabrics; glass; wood and metals.

In addition, the spectral sensitivity of the compositions can be extended to the visible light range by incorporating therein, either in conjunction with the ketone or alone, visible light-absorbing energy transfer agents such as phthalein dyes, e.g., fluoresceins, erythrosins, eosin and halofluoresceins; aminoacridine dyes such as 3,6 - diaminoacridine hydrochloride, acriflavine and acridine orange; carbocyanine dyes such as 3,3' - diethyl oxacarbocyanine iodide, 3,3' - diethyl - 9 - methyl oxacarbocyanine iodide, and 3,3',9 - trimethyl thiacarbocyanine bromide; or cyanine dyes such as 1,1' - diethyl - 2,2' - cyanine odide, 1,1' - diethyl - 4,4' - cyanine iodide, and 1,3' - diethyl - 4,2' - quinolyl thiacyanine iodide.

(F) Utility

The compositions of this invention are useful for light-actuated colored image formation and are used in a dry, non-silver photographic process capable of imaging in various colors and shades on various substrates, including fabrics, papers and similar fibrous sheet materials and films. Apparatus useful in conducting photographic dye-printing is described in U.S. Pats. 2,214,365 and 2,655,802. Even very soft paper, as for example tissue paper, which has been treated with a composition of this invention, can be readily printed by projecting the desired graphic pattern onto the treated paper and irradiating it to effect the color-forming reaction.

The image formulations are conveniently applied to the carrier substrates as solutions in volatile solvents such as those described above. They may be thus continuously coated on roll papers and films utilizing such typical devices for continuously laying down wet films as nip fed three roll reverse roll coating heads, gravure coaters, trailing blade coaters and Mayer bar coating heads (wherein the coating thickness is controlled by a threaded or a wire wound bar). The wet thickness is adjusted such that the dry thickness after solvent removal is in the desired range (about .1–1.5 mil, usually around .3–.5 mil on paper, .8–1.1 mil on film). After the solvent has been removed, as by radiant heating or forced air evaporation, the coated paper or film is wound up on rolls in the usual way.

Any convenient light source providing wavelengths in the near ultraviolet region of the spectrum that overlap the ketone's absorption bands may be used to activate the compositions for imidazolyl radical and image formation. The light may come from natural or artificial sources, may be monochromatic or polychromatic, incoherent or coherent (i.e. laser beam such as a pulsed nitrogen laser emitting at 337 m$\mu$), and for high efficiency should correspond closely in wavelengths to the principal absorption bands of the ketone sensitizers employed and should be sufficiently intense to activate a substantial proportion of the sensitizer molecules.

Ultraviolet emitting cathode ray tubes widely useful in printout systems for writing on photosensitive materials, are particularly versatile light sources for use in imaging the subject compositions. These in general involve a UV-emitting phosphor internal coating as the means for converting electrical energy to light energy and a fiber optic face plate as the means for directing the radiation to the photosensitive target. For purposes of this invention, the phosphors should emit strongly in the 300–400 m$\mu$ range so as to substantially overlap the near UV-absorption characteristic of the ketone-containing compositions. Representative phosphors include the P4B (emitting at 300–500m$\mu$, peaking at 410 m$\mu$, P16 (330–460, peaking at 380 m$\mu$) and P22B (390–510, peaking at 450 m$\mu$) types. (The Electronic Industries Association, New York, N. Y., assigns P-numbers and provides characterizing information on the phosphors; phosphors with the same P-number having substantially identical characteristics.)

Various cathode ray tube printout systems, including a multipurpose electronic information output systems comprising a central electronic system feeding and operating a multiplicity of CRT printers, each capable of performing a separate function and of providing soft or hard copy are described in James and Witterholt, Ser. No. 622,526, filed Mar. 13, 1967, incorporated herein by reference. The imaging compositions of this invention are useful in such a system.

THE EXAMPLES

The following examples illustrate the compositions of this invention and their uses:

EXAMPLES 1–4 p,p'-Bis-(dialkylamino)benzophenones as identified in the table below were added to acetone solutions containing 0.05 mole 2,2'-bis(o-chlorophenyl)4,4',5,5'-1,2'-biimidazole (HABI), 0.01 mole tris(N,N-diethylamino-o-tolyl) methane, 0.03 mole p-toluenesulfonic acid monohydrate and 0.0033 mole pyrene quinone. They were added in the three amounts shown in the table under the column marked "Mole Ratio S/HABI." The six solutions (and also the two controls shown in the table) were spotted on 1" x 4" Whatman No. 1 filter paper, and, after the acetone had evaporated, were irradiated by contact flashing with one flash from a xenon flash lamp (HiCo Lite, emitting ultraviolet and visible light above 200 m$\mu$ and approximating ordinary sunlight) through a filter described below. The filter used in Example 1 of the table transmitted radiant energy between the wavelengths 295–405 m$\mu$. The filter used in Example 2 transmitted radiant energy from 350 m$\mu$ on into the visible; the filter Example 3 transmitted from 370 m$\mu$ on into the visible; and the filter of Example 4 transmitted from 385 m$\mu$ on into the visible.

The results are tabulated below in terms of the optical density of the colored image produced on irradiation, determined with a MacBeth reflectance sensitometer and corrected (by subtraction) for the background optical density.

NEAR UV-LIGHT SENSITIZED BIIMIDAZOLE PHOTOLYSIS

| | | Optical Density | | | |
|---|---|---|---|---|---|
| | | Example 1 | Example 2 | Example 3 | Example 4 |
| Sensitizer (S) | Mole ratio S/HABI | Filter (transmits 295–405 m$\mu$) | Filter (transmits 350 m$\mu$→) | Filter (transmits 370 m$\mu$→) | Filter (transmits 385 m$\mu$→) |
| p,p'-Bis(dimethylamino)-benzophenone; $\lambda_{max}$. 370 m$\mu$, cut off 400 m$\mu$. | .01 | 1.11 | .03 | Nil | Nil. |
| | .10 | 1.13 | .41 | Nil | Nil. |
| | .50 | 1.15 | .96 | .20 | Nil. |
| p,p'-Bis(diethylamino)-benzophenone; $\lambda_{max}$. 375 m$\mu$, cut off 410 m$\mu$. | .01 | 1.13 | .32 | Nil | Nil. |
| | .10 | 1.14 | .96 | .05 | Nil. |
| | .50 | 1.02 | .97 | .59 | Nil. |
| No sensitizer | | 1.05 | .05 | Nil | Nil. |
| No sensitizer and no biimidazole | | Nil | Nil | Nil | Nil. |

The results of Examples 1–4 show that (1) the imaging systems image rather poorly with light having wavelengths greater than 350 mμ unless sensitizer is present; (2) the biimidazole is needed for color formation; (3) the substituted ketones effectively sensitize biimidazole photolysis, consequently the imaging reaction, with light in the near UV range, the effect being more pronounced at the higher concentrations.

The test demonstrates biimidazole photolysis to triarylimidazolyl radicals through reaction of the radicals with a triarylmethane leuco dye, evidenced by formation of the triarylmethane dye's characteristic blue color; the more effective the system to generate triarylimidazolyl radicals under a given light stimulus, the deeper the color.

EXAMPLES 5–8

Imaging formulations were prepared as described in Examples 1–4 except that (a) the quinone was omitted and (b) the ketones were employed in amounts corresponding to 0.5 mole/mole o-ClHABI.

The solutions were applied to bleached-sulfite roll stock paper and the acetone allowed to evaporate to give coatings about 0.5 mil thick. Each paper was then irradiated with a xenon flash lamp (described in Examples 1–4), through a filter system transmitting from 315 to 420 mμ with peak transmittance at 350 mμ, obtained by overlaying a UG–11 filter (transmitting from 230 to 420 mμ) with polyester film (transmitting from 315 mμ into the visible beyond 420 mμ).

Each sample was exposed for 50 seconds total, during which time the change in optical density was monitored with a reflectance sensitometer. The results are expressed below in terms of imaging speed, which is the time in seconds required to yield a 0.3 optical density increase over the background, and the final optical density.

| Example | p,p'-Bis(dialkylamino)-benzophenone | Imaging results | |
|---|---|---|---|
| | | Speed, sec. | O.D., 50 sec. |
| 5 | Alkyl=methyl | 2.6 | .96 |
| 6 | Alkyl=ethyl | 1.3 | 1.15 |
| 7 | Control 1=no ketone | 5.0 | 1.01 |
| 8 | Control 2=ketone as above but no o-ClHABI | No color formation. | |

The results of Examples 5–8 show the benzophenones are highly effective sensitizers in the near UV; with the diethylamino substituted-benzophenone more than tripling the speed, while increasing the optical density significantly.

The preceding examples may be varied as to components as described within the scope of the invention decribed hereinbefore and as understood and practiced by one skilled in the art. For example, substantially similar results may be obtained on substituting 2,2'-bis(o-chlorophenyl) - 4,4' - 5,5' - tetrakis(m-methoxyphenyl)biimidazole for the indicated biimidazole in the above examples.

As many apparently widely different embodiments of this invention may be made without departing from the spirit and scope thereof, it is understood that this invention is not limited to the specific embodiments thereof.

The embodiments of the invention in which an exclusive property or privilege is claimed are defined as follows:

1. A photosensitive composition which comprises
   (A) a hexaarylbiimidazole that absorbs in the ultraviolet principally at wavelengths below 300 mμ and is dissociable to triarylimidazolyl radicals by such radiation, and
   (B) a p-aminophenyl ketone having the formula

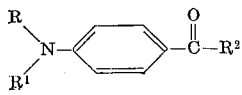

wherein R and R¹ are each hydrogen or lower alkyl, and R² is lower alkyl, monocarbocyclic aryl, or

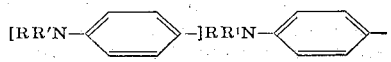

and which has a light absorption maximum in the ultraviolet at wavelengths greater than 300 mμ that is stronger than the absorption of the biimidazole at such wavelengths, and which is present in an amount sufficient to sensitize the hexaarylbiimidazole to pholoysis.

2. The composition of claim 1 which contains additionally
   (C) an oxadizable leuco dye selected from the class consisting of an aminotriarylmethane, an aminoxanthene, an aminothioxanthene, an amino-9,10-dihydroacridine, an aminophenoxazine, an aminophenothiazine, an aminodihydrophenazine, an aminodiphenylmethane, a leuco indamine, an aminohydrocinnamic acid, a hydrazine, a leuco indigoid dye, an amino-2,3-dihydroanthraquinone, a tetrahalo-p,p'-biphenol, a 2(p-hydroxyphenyl)-4,5-diphenylimidazole, a phenethylaniline, a 10-acyl-aminodihydrophenazine, a 10-acyl-aminophenothiazine, a 10-acyl - aminophenoxazine; an aminotriarylmethane wherein the methane hydrogen has been replaced by alkylthio, benzylthio, 2-phenylhydrazino, or alkoxycarbonyl; an aminotriarylmethane wherein two aryl groups are substituted with a p-disubstituted amino and an alkyl group and the third aryl is p-alkylthiophenyl, p - arylthiophenyl, aralkylthiophenyl, 2-thienyl, 2-furyl, 3,4-methylenedioxyphenyl, 2-methoxy-4(C₁ to C₈)alkoxyphenyl and 3,4-di(C₁ to C₈) alkoxyphenyl.

3. The composition of claim 2 which contains additionally
   (D) an image fixing system comprising
      (1) a second photooxidant which is activatable at wavelengths different from those required to activate the ketone-biimidazole system, does not photooxidize leuco dye to dye, and is reducible in its photoactivated state to a second reductant, and
      (2) a first reductant which is a reductant for the photoactivated second oxidant but is not a rereductant for the photoactivated biimidazole, said first reductant reducing the photoactivated second oxidant to the second reductant, said second reductant being a reductant for the activated biimidazole whereby it prevents the colorforming reaction between the activated biimidazole and leuco dye.

4. The composition of claim 1 wherein component (B) is present in amounts of about 0.1 to about 2 moles per mole of component (A).

5. The composition of claim 1 wherein component (B) is a p,p'-bis(diloweralkylamino)benzophenone.

6. The composition of claim 1 wherein the component (B) is p,p'-bis(dimethylamino)benzophenone.

7. The composition of claim 1 wherein the component (B) is p,p'-bis(diethylamino)benzophenone.

8. The composition of claim 1 wherein the biimidazole has the formula

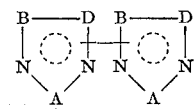

wherein A, B and D represent phenyl, biphenyl, naphthyl, furyl or thienyl which can contain substituents having Hammett sigma values in the range −.4 to +.4, and each dotted circle stands for four delocalized electrons.

9. The composition of claim 8 wherein the 2 and 2' aryl groups are phenyl rings bearing an ortho substituent selected from fluorine, chlorine, bromine, lower alkyl and lower alkoxy.

10. The composition of claim 9 wherein the 4 and 5 aryl groups are phenyl rings.

11. The composition of claim 2 wherein
(A) the hexaarylbiimidazole has the formula

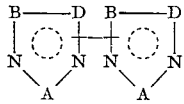

wherein A, B and D represent phenyl, biphenyl, naphthyl, furyl or thienyl which can contain substituents having Hammett sigma values in the range $-.4$ to $+.4$, and each dotted circle stands for four delocalized electrons;
(B) the ketone has the formula

wherein R and $R^1$ are each hydrogen or lower alkyl, and $R^2$ is lower alkyl, monocarboxylic aryl or

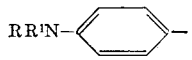

and
(C) the leuco dye is a triarylmethane salt wherein at least 2 of the aryl groups are phenyl having a para-$R_1R_2N$ substituent in which $R_1$ and $R_2$ are $C_1$–$C_{10}$ alkyl, 2-hydroxyethyl, 2-cyanoethyl, benzyl or phenyl, and having an ortho $C_1$–$C_6$ alkyl, $C_1$–$C_6$ alkoxy, fluoro, chloro, or bromo-substituent, and the third aryl can be the same as the first two or can be thienyl, furyl, phenyl, or substituted phenyl.

12. The composition of claim 11 wherein the ketone is p,p'-bis(diethylamino)benzophenone; the biimidazole is the 2-(o-chlorophenyl)-4,5-(diphenyl)imidazolyl dimer, and the leuco dye is an acid salt of tris(N,N-diethylamino-o-tolyl)-methane.

13. The composition of claim 11 wherein the ketone is p,p'-bis(diethylamino)benzophenone; the biimidazole is 2,2'-bis(o-chlorophenyl)-4,4',5,5'-tetrakis(m-methoxyphenyl)-biimidazole; and the leuco dye is an acid salt of tris-(N,N-diethylamino-o-tolyl)methane.

14. A coating composition comprising the composition of claim 11 dissolved in an inert solvent.

15. A coated composition comprising the composition of claim 11 and an inert substrate.

16. The composition of claim 15 wherein the substrate is paper.

17. The composition of claim 15 wherein the substrate is a film.

18. The composition of claim 3 where the second photooxidant is a quinone and the first reductant is a lower alkyl nitrilotriacetate or a lower alkyl nitrilotripropionate.

19. The composition of claim 15 wherein the second photooxidant (a) is pyrenequinone or phenanthraquinone and the first reductant (b) is a polyalkylene glycol or an aryl phenoxy polyoxyethylene ethanol.

20. Process which comprises irradiating the composition of claim 1 with ultraviolet light.

21. Process which comprises irradiating the composition of claim 11 with ultraviolet light.

22. Process which comprises irradiating the composition of claim 15 with ultraviolet light.

References Cited

UNITED STATES PATENTS

| 3,121,632 | 2/1964 | Sprague et al. | 96—90X |
| 3,390,996 | 7/1968 | MacLachlan | 96—90 |

OTHER REFERENCES

Kosor, Light-Sensitive Systems, Aug. 27, 1965, John Wiley & Sons, New York, pp. 139.

NORMAN G. TORCHIN, Primary Examiner

R. E. FICHTER, Assistant Examiner

U.S. Cl. X.R.

96—48

UNITED STATES PATENT OFFICE
CERTIFICATE OF CORRECTION

Patent No. 3,552,973          Dated January 5, 1971

Inventor(s)  DAVID HENRY FISHMAN

It is certified that error appears in the above-identified patent and that said Letters Patent are hereby corrected as shown below:

Col. 4, line 30, the formula should appear as follows:

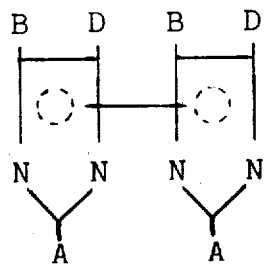

Col. 16, line 4, the formula should appear as follows:

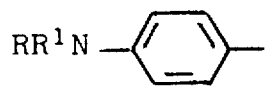

Col. 16, line 13, the word "oxadizable" should read -- oxdizable --.
Col. 16, line 65, the formula should appear as follows:

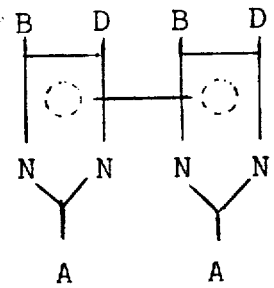

UNITED STATES PATENT OFFICE
CERTIFICATE OF CORRECTION

Patent No. 3,552,973　　　　　　　Dated　January 5, 1971

Inventor(s)　DAVID HENRY FISHMAN

It is certified that error appears in the above-identified patent and that said Letters Patent are hereby corrected as shown below:

Col. 17, line 7, the formula should appear as follows:

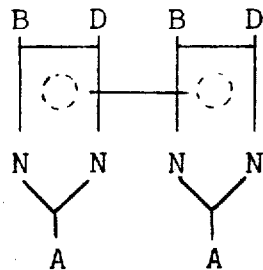

Signed and sealed this 14th day of September 1971.

(SEAL)
Attest:

EDWARD M. FLETCHER, JR.　　　　　ROBERT GOTTSCHALK
Attesting Officer　　　　　　　　Acting Commissioner of Pat(